United States Patent
Eley et al.

(10) Patent No.: US 12,072,047 B2
(45) Date of Patent: Aug. 27, 2024

(54) FULL FLOW HOSE FITTING

(71) Applicant: Eley Corporation, Reno, NV (US)

(72) Inventors: Craig D. Eley, Reno, NV (US); Darin Schollmeyer, Creighton, NE (US); Kyle Eley, Washoe Valley, NV (US)

(73) Assignee: Eley Corporation, Reno, NV (US)

( * ) Notice: Subject to any disclaimer, the term of this patent is extended or adjusted under 35 U.S.C. 154(b) by 0 days.

(21) Appl. No.: 17/824,311

(22) Filed: May 25, 2022

(65) Prior Publication Data

US 2022/0381383 A1 Dec. 1, 2022

Related U.S. Application Data

(60) Provisional application No. 63/194,564, filed on May 28, 2021.

(51) Int. Cl.
*F16L 33/207* (2006.01)
*F16L 19/02* (2006.01)

(52) U.S. Cl.
CPC .......... *F16L 33/2076* (2013.01); *F16L 19/02* (2013.01)

(58) Field of Classification Search
CPC ... F16L 19/02; F16L 33/2076; F16L 33/2073; F16L 33/2078; F16L 33/207; F16L 33/213; F16L 33/22; F16L 33/223
USPC ........................................... 285/251, 148.16
See application file for complete search history.

(56) References Cited

U.S. PATENT DOCUMENTS

| | | | | |
|---|---|---|---|---|
| 1,263,557 A * | 4/1918 | Hilton | ............... | F16L 33/2076 285/251 |
| 1,684,713 A * | 9/1928 | Norgren | ............... | F16L 33/223 |
| 2,219,266 A * | 10/1940 | Hirsch | ............... | F16L 33/223 |
| 2,410,600 A * | 11/1946 | Cowles | ............... | F16L 33/2076 |
| 2,448,747 A * | 9/1948 | Swain | ............... | 285/251 |
| 2,517,606 A * | 8/1950 | Spender | ............... | 285/148.16 |
| 3,017,203 A * | 1/1962 | MacLeod | ............ | F16L 33/2076 |
| 3,262,721 A * | 7/1966 | Knight | | |
| 3,951,438 A * | 4/1976 | Scales | | |
| 4,023,836 A * | 5/1977 | Applehans | | |
| 4,366,841 A * | 1/1983 | Currie | ................ | F16L 33/2076 |
| 4,400,021 A * | 8/1983 | Duffield | ............... | F16L 33/223 285/251 |
| 4,498,691 A * | 2/1985 | Cooke | ................ | F16L 33/2076 |
| 6,318,763 B1 * | 11/2001 | Huang | ............... | F16L 33/2078 |
| 2004/0032124 A1 * | 2/2004 | Lefere | | |
| 2006/0028020 A1 * | 2/2006 | Fullbeck | ............. | F16L 33/2073 |
| 2008/0185840 A1 * | 8/2008 | Menor | ................ | F16L 33/2073 |

(Continued)

FOREIGN PATENT DOCUMENTS

EP 57920 A * 8/1982 .......... F16L 33/2076

*Primary Examiner* — William S. Choi
(74) *Attorney, Agent, or Firm* — Davis Graham & Stubbs LLP

(57) ABSTRACT

A full flow hose fitting includes a fitting end, having an elongated stem with a barbed external surface and a retaining collar, having a barbed internal surface. An internal diameter of the elongated stem approximates an internal diameter of a hose to be attached to the fitting. An inner diameter of the retaining collar is larger than an outer diameter of the elongated stem, defining a retention space to secure an end of the hose when it is disposed between the elongated stem and the retaining collar. The fitting is formed from an assembly process that pushes fittings into the end of the hose rather than using an internal or external crimped ferrule to secure them.

15 Claims, 11 Drawing Sheets

(56) References Cited

U.S. PATENT DOCUMENTS

2011/0006515 A1* 1/2011 Yanik .................. F16L 33/2076
2016/0248238 A1* 8/2016 Warren
2019/0226611 A1* 7/2019 Wildfang ................ F16L 19/02

* cited by examiner

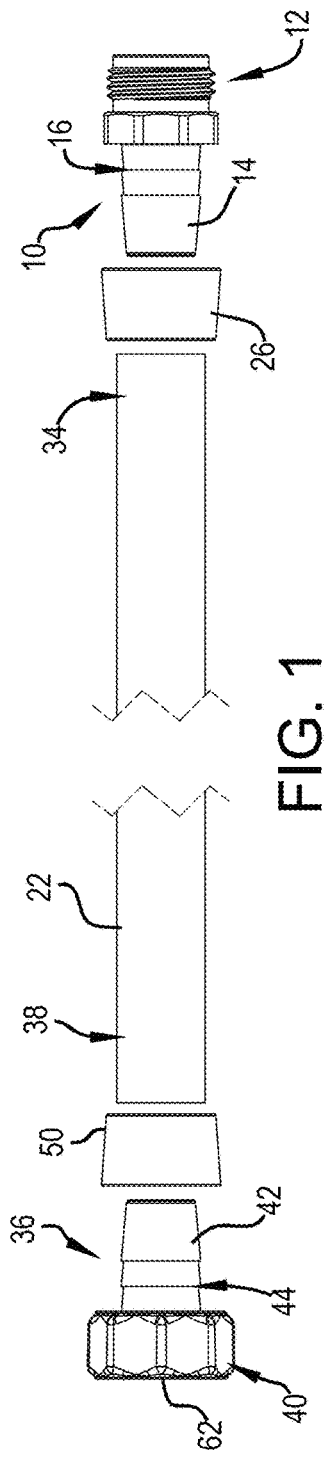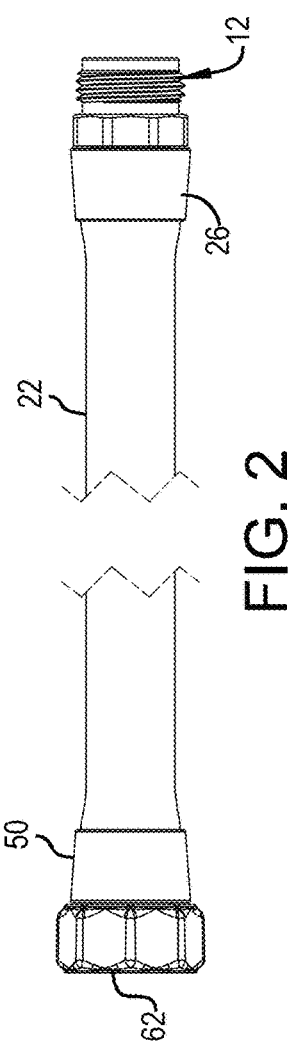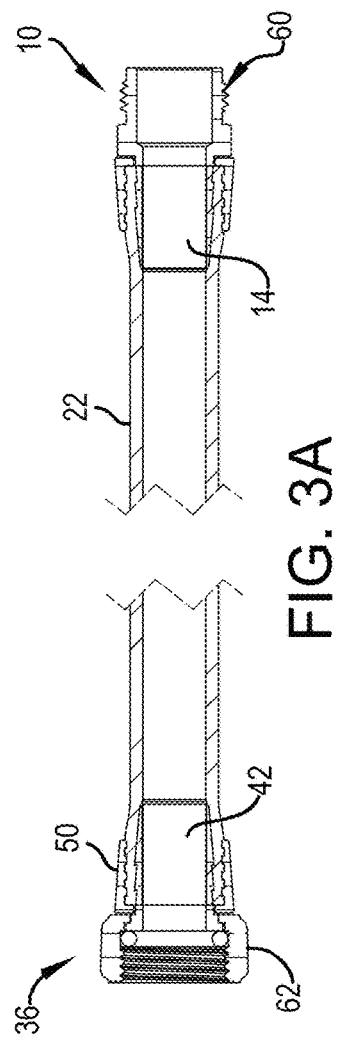
FIG. 1
FIG. 2
FIG. 3A

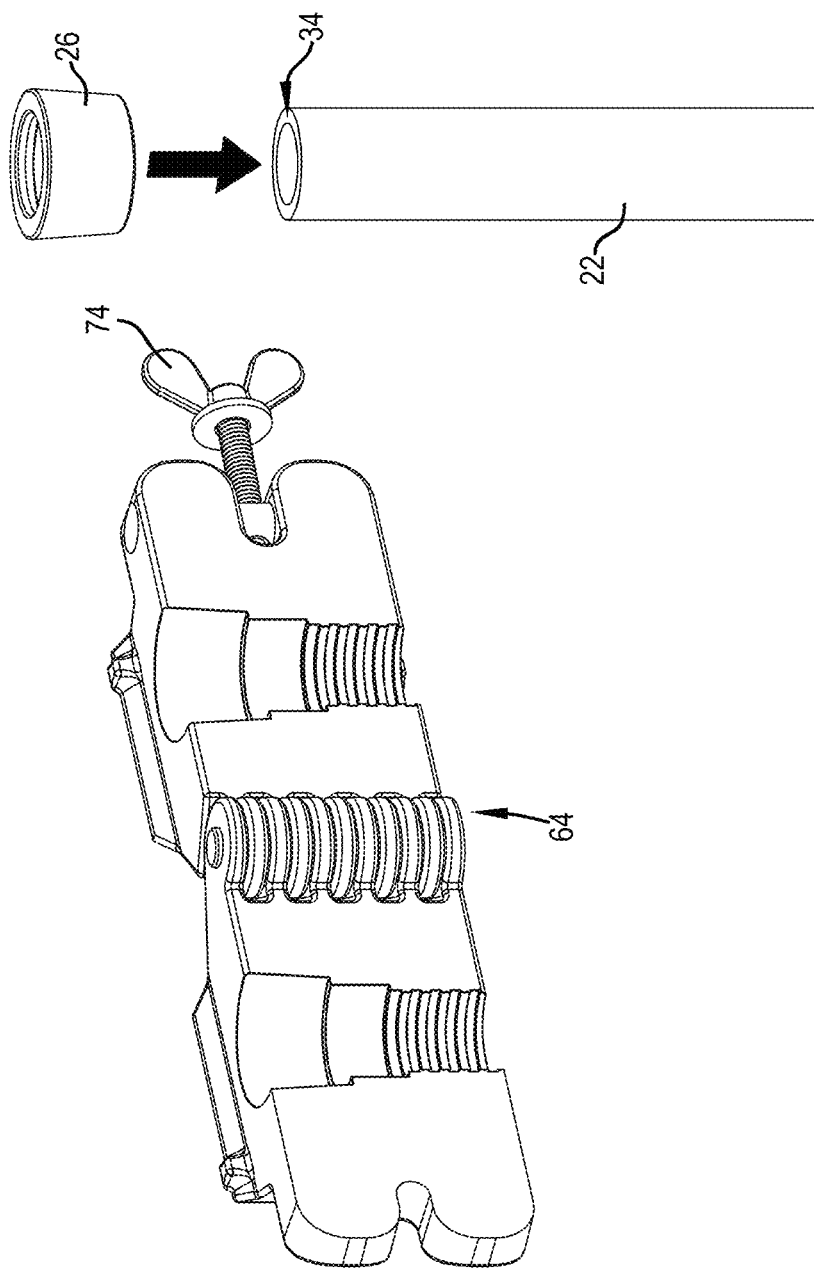

FULL FLOW HOSE FITTING

CROSS-REFERENCE TO RELATED APPLICATION(S)

This application claims the benefit of U.S. Provisional Patent Application No. 63/194,564, filed May 28, 2021, which is incorporated herein by reference in its entirety for all purposes.

BACKGROUND

Most garden hoses can be coupled with one another using a two-part fitting. A male portion of the fitting is defined by an externally threaded, cylindrical end that is formed from thin brass. The male fitting is threadably received within a female, internally threaded, companion member. When threaded together, the cylindrical end of the male fitting is urged against a rubber gasket disposed within the female fitting, which provides a sealed coupling between the fitting components. Such fittings provide an inexpensive and simple manner of joining two lengths of garden hose with one another or coupling an accessory to the end of a garden hose.

There are many different methods of securing a fitting on the end of a hose. Generally, the methods rely on some form of clamping force to secure a fitting inside the hose and on the outside of the hose. The clamping force must compress the hose between the inside fitting member and the outside fitting member.

External clamping requires a barbed fitting whose outside diameter is similarly sized as the inside diameter of the hose. Mechanically reduced clamps squeeze the hose onto the fitting barbs. This type of clamping is strong because of the machined fitting but the clamp is rather awkward and bulky and can catch on objects as it is used. It reduces the flow rate because the fitting inside diameter must be smaller to fit into the hose easily.

External crimping is like external clamping as it requires a barbed fitting whose outside diameter is the same size as the inside diameter of the hose. It differs in that it uses a malleable ferrule that must be reduced by a die composed of segmented sections that mechanically reduces the ferrule to a predetermined size compressing the hose onto the barbed fitting. These fittings are strong and do not catch on objects while being used. It reduces the flow rate because the fitting inside diameter must be smaller to fit into the hose easily.

Internal expansion of the fitting is by far the most popular form of fitting in a garden hose because it creates a full flow where the fitting is the same internal dimension as the hose. This is accomplished with a fitting that has a malleable stem that fits inside the hose. A preformed ferrule with ridges is placed over the hose; the fitting with the malleable stem is inserted into the hose. This assembly is then placed over a die of expandable fingers that mechanically increases the inside diameter of the fitting stem to the same size as the inside of the hose. This process compresses the hose between the expanded stem and the preformed ferrule on the outside. This method creates full flow, but the components are weaker than a machined barb fitting.

What is needed is a garden hose fitting system, having an internal diameter that is equal to an internal diameter of the hose, to provide full flow. However, the system should be formed from a simplified assembly process that pushes the fittings into the end of the hose rather than using an internal or external crimped ferrule to secure them.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Embodiments of a hose fitting are disclosed along with methods for securing the hose fitting with various types of hoses. In various embodiments, the hose fitting includes an elongated stem that extends rearwardly from a fitting end portion. A plurality of barbs extend outwardly from an exterior surface of the elongated stem to engage an internal surface of a length of hose. In some embodiments, an internal diameter of the elongated stem approximates an internal diameter of the length of hose. A retaining collar has an internal diameter that provides a defined, limited space for the length of hose to expand when the elongated stem of the hose fitting is disposed into an open end portion of the length of hose.

In one embodiment of a method of assembling hose fittings of the present technology onto a length of hose, a retaining collar of a hose fitting is placed over an open end portion of the length of hose. In some embodiments, the retaining collar and open end portion of the length of hose can be placed into a collet. A lubricant can be used to wet an elongated stem of a hose fitting to aid in further assembly of the hose fitting. In some situations, a lubricant may not be necessary. A push rod may be placed into the elongated stem of the hose fitting, which is placed adjacent the open end portion of the length of hose. A yoke is then placed onto the collet. The yoke is tightened until the elongated stem is inserted into the open end portion of the length of hose and the retaining collar. The yoke can then be loosened and removed from the collet. The push rod can then be removed from the elongated stem and the collet can be removed from the completed hose fitting assembly.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 depicts a partially exploded view of one embodiment of a hose fitting of the present technology and a length of hose.

FIG. 2 depicts a side view of one embodiment of the hose fitting of FIG. 1 as the same can be coupled with the length of hose.

FIG. 3A depicts a side, sectional view of the hose fitting and hose of FIG. 2.

FIG. 4 depicts one exemplary manner in which a collar of one embodiment of a hose fitting of the present technology can be placed on an end of a hose.

DETAILED DESCRIPTION

Figure 3C:
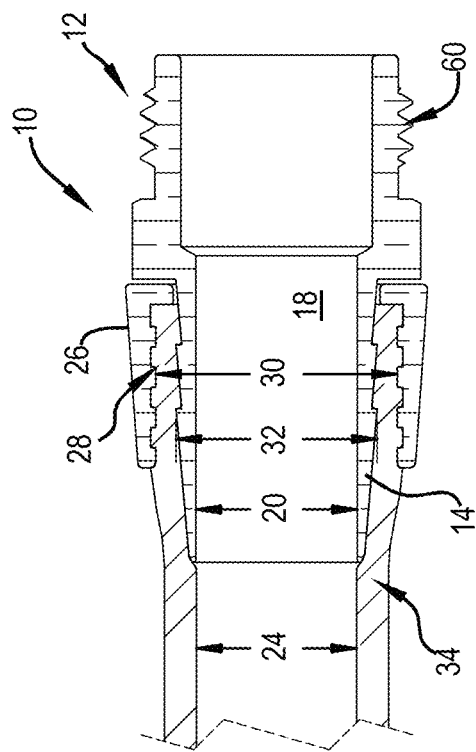
FIG. 3C depicts a sectional view of the male fitting of FIG. 3A.
Figure 3B:
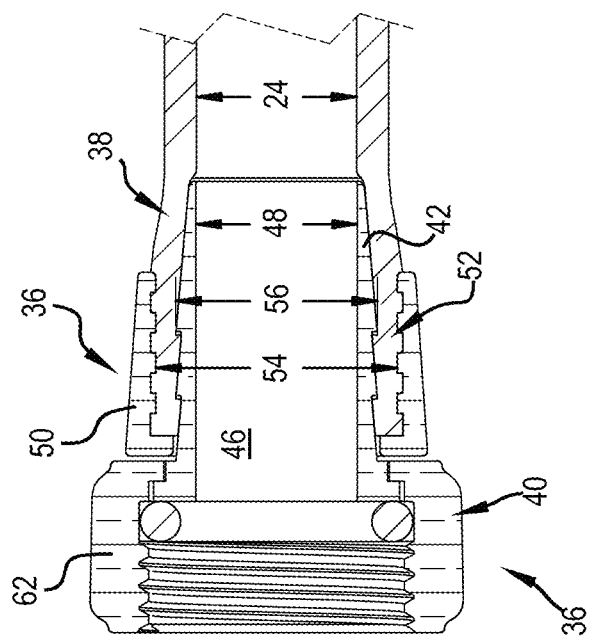
FIG. 3B depicts a sectional view of the female fitting of FIG. 3A.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 1-3C, embodiments of a hose fitting are disclosed that may be fitted with various types of hose. The hose fitting of the present technology will typically include a first hose fitting 10 having a fitting end 12 and an elongated stem 14 that extends outwardly from the fitting end 12. The elongated stem 14 includes a plurality of barbs 16 extending from its external surface. An internal surface 18 of the first hose fitting 10 defines an open fluid pathway through the first hose fitting 10. An internal diameter 20 of the elongated stem 14 is sized to approximate an internal diameter of a length of hose 22 to which the first hose fitting 10 is being secured. In some embodiments, the internal diameter 20 of the elongated stem 14 is equal to the internal diameter 24 of the length of hose 22. In other embodiments, the internal diameter 20 of the elongated stem 14 is larger than the internal diameter 24 of the length of hose 22. In still other embodiments, it is contemplated that the internal diameter 20 of the elongated stem 14 is slightly smaller than the internal diameter 24 of the length of hose 22. The first hose fitting 10 also includes a first retaining collar 26, having a barbed internal surface 28 that defines an opening that extends through the first retaining collar 26. In various embodiments, an inner diameter 30 of the first retaining collar opening is larger than the outer diameter 32 of the elongated stem 14. This defines a first retention space to secure a first end portion 34 the length of hose 22 when the first end portion 24 of the length of hose 22 is disposed between the elongated stem 14 and the first retaining collar 26.

In various embodiments it will be desirable to a second hose fitting 36 on the opposite, second end portion 38 of the length of hose 22. In such embodiments, the second hose fitting 36 will be similar to the first hose fitting 10, having a fitting end 40 and an elongated stem 42 that extends outwardly from the fitting end 40. As with the first hose fitting 10, the elongated stem 42 includes a plurality of barbs 44 extending from its external surface and an internal surface 46 of second hose fitting 36 defines an open fluid pathway through the second hose fitting 36. An internal diameter 48 of the elongated stem 42 is sized to approximate an internal diameter 24 of the length of hose 22 to which the second hose fitting 36 is being secured. However, the internal diameter 48 of the elongated stem 42 may be made slightly larger, equal to, or smaller than, the internal diameter 24 of the length of hose 22, according to the needs of any particular application. The second hose fitting 36 also includes a second retaining collar 50, having a barbed internal surface 52, which defines an opening that extends through the second retaining collar 50, and an inner diameter 54 that is larger than an outer diameter 56 of the elongated stem. As with the first retaining collar 10, this defines a second retention space to secure a second end portion 38 the length of hose 22 when the second end portion 38 of the length of hose 22 is disposed between the elongated stem 42 and the second retaining collar 50.

It is contemplated that it will be desirable to removably couple the first hose fitting 10 and second hose fitting 36 with one or more of a fluid source, such a water faucet, another length of hose, or an implement, such as a spray nozzle, sprinkler, or the like. Accordingly, the fitting end 12 of the first hose fitting 10, in some embodiments, includes a threaded exterior surface 60 to define a male hose fitting, which is configured to removably couple with a female hose fitting. Similarly, in various embodiments, the fitting end 40 of the second hose fitting 36 includes a female hose nut 62, with a threaded interior surface, that is rotatably coupled with the elongated stem 42 of the second hose fitting 36 and configured to removably couple with a male hose fitting. It is also contemplated that a quick connect feature (not depicted) could be incorporated with either or both of the first hose fitting 10, rather than a threaded exterior surface 60 (male fitting). The same is true of the second hose fitting 36 (female hose nut 62). It could be a female quick connect rather than thread female hose nut 62. Depending on the desired application, it is contemplated that components of the hose fitting may be formed from various known materials, including forged brass.

It is contemplated that there will be various methods of assembling the first hose fitting 10 and second hose fitting 36 of the present technology onto a length of hose 22. In various embodiments, the first retaining collar 26 is positioned over the open first end portion 34 of the length of hose 22 so that barbs, extending outwardly from an internal surface 28 of the first retaining collar 26, are positioned adjacent an external surface of the length of hose 22. A first hose fitting 10 is positioned adjacent the open first end portion 34 of the length of hose. The elongated stem 14 of the first hose fitting 10 is then inserted, at least partially, into the open first end portion 34 of the length of hose 22 so that the barbs 16 of the elongated stem 14 engage an internal surface of the length of hose 22. An internal diameter 20 of the elongated stem 14 approximates an internal diameter 24 of the length of hose 22, which urges the first end portion 34 of the length of hose 22 into a first retention space, securing a first end portion 34 the length of hose 22 between the elongated stem 14 and the first retaining collar 26. It is contemplated that the aforementioned exemplary method of assembling the first hose fitting 10 with the first end portion 34 of the length of hose 22 may also be employed for assembling the second hose fitting 36 with a length of hose. In various embodiments, these steps may be performed manually, using hand tools, or in an automated assembly, using known mechanical means.

Figure 5:
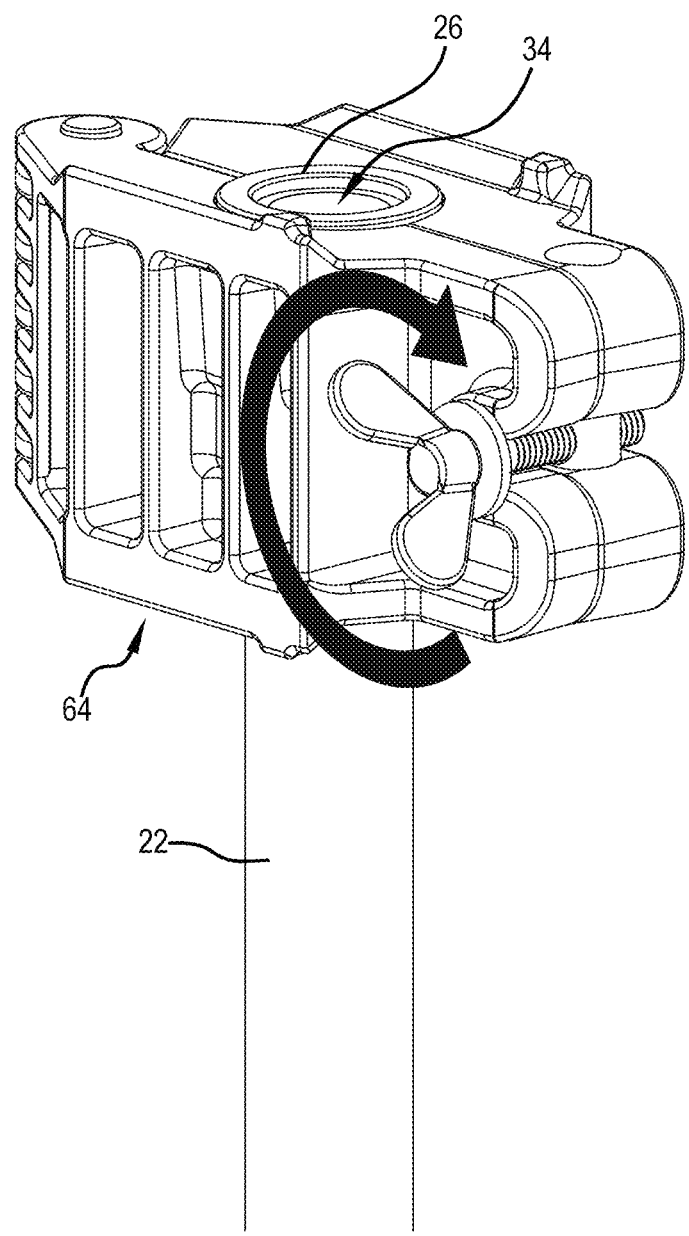
FIG. 5 depicts one exemplary manner in which the collar and hose of FIG. 4 can be placed into one embodiment of a collet of the present technology.
Figure 6:
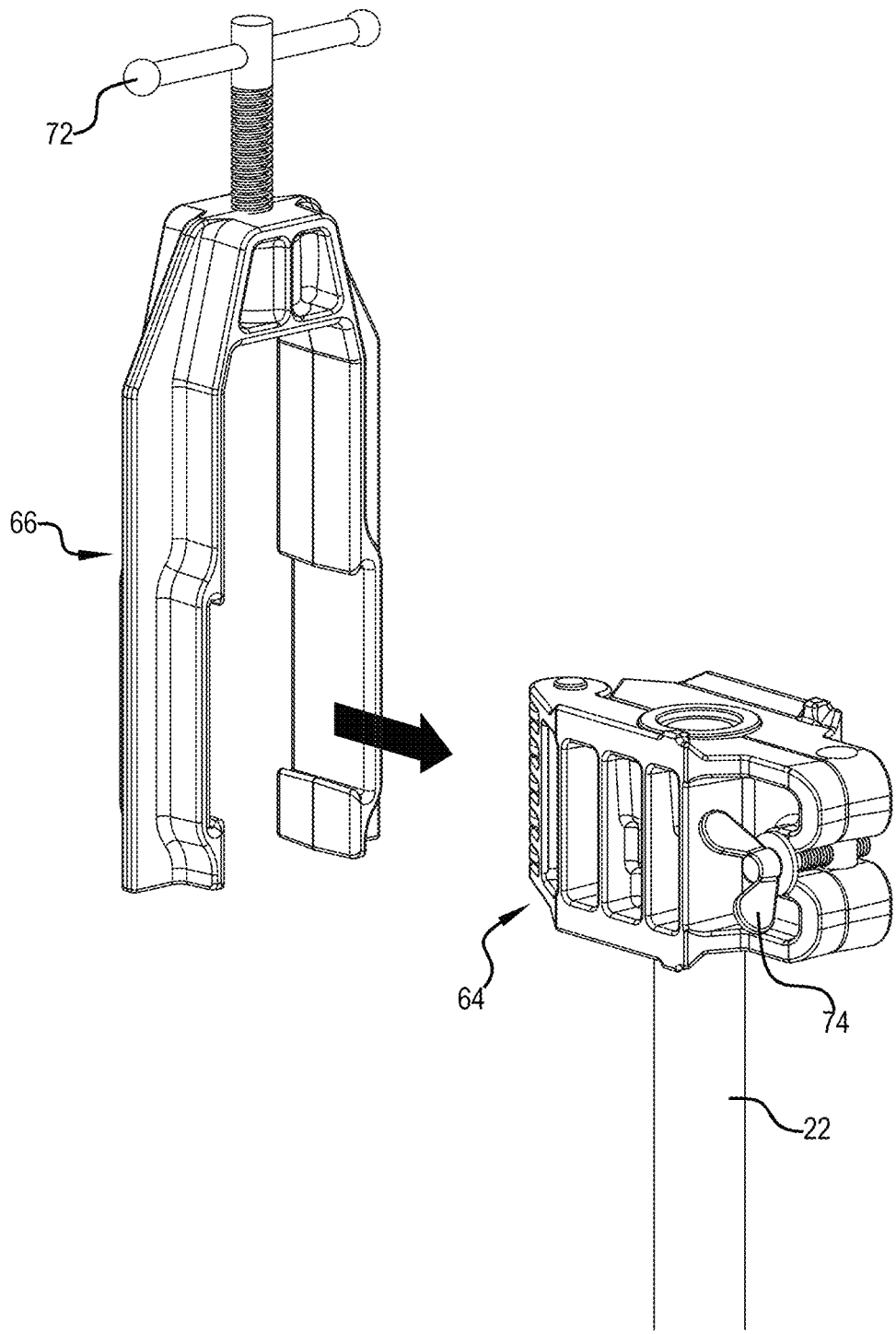
FIG. 6 depicts one exemplary manner in which one embodiment of a yoke can be placed onto the collet of FIG. 5.
Figure 7:
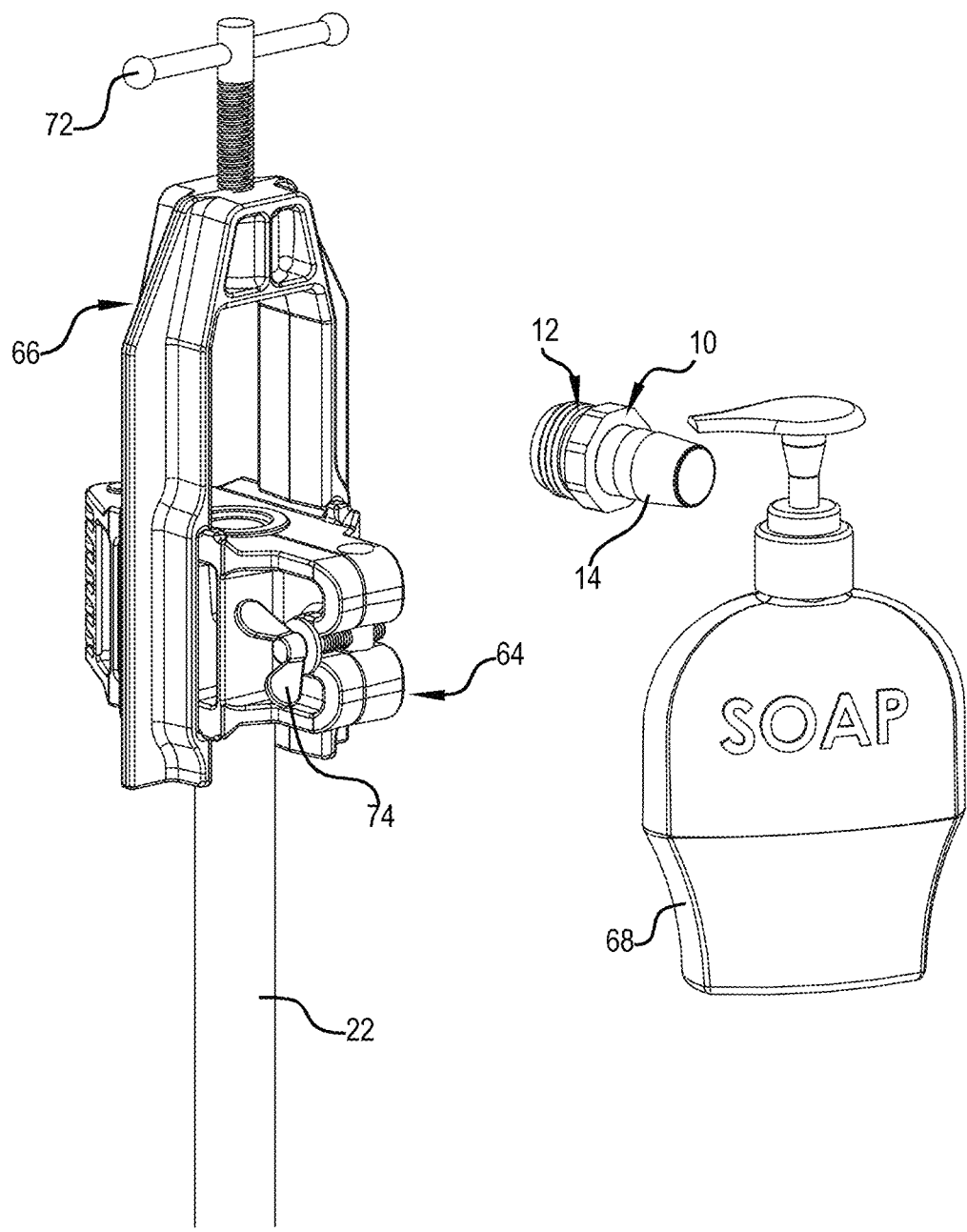
FIG. 7 depicts one embodiment of a step for wetting barbs of the fitting of FIG. 6 with diluted liquid soap to aid in assembly of the fitting.
Figure 8:
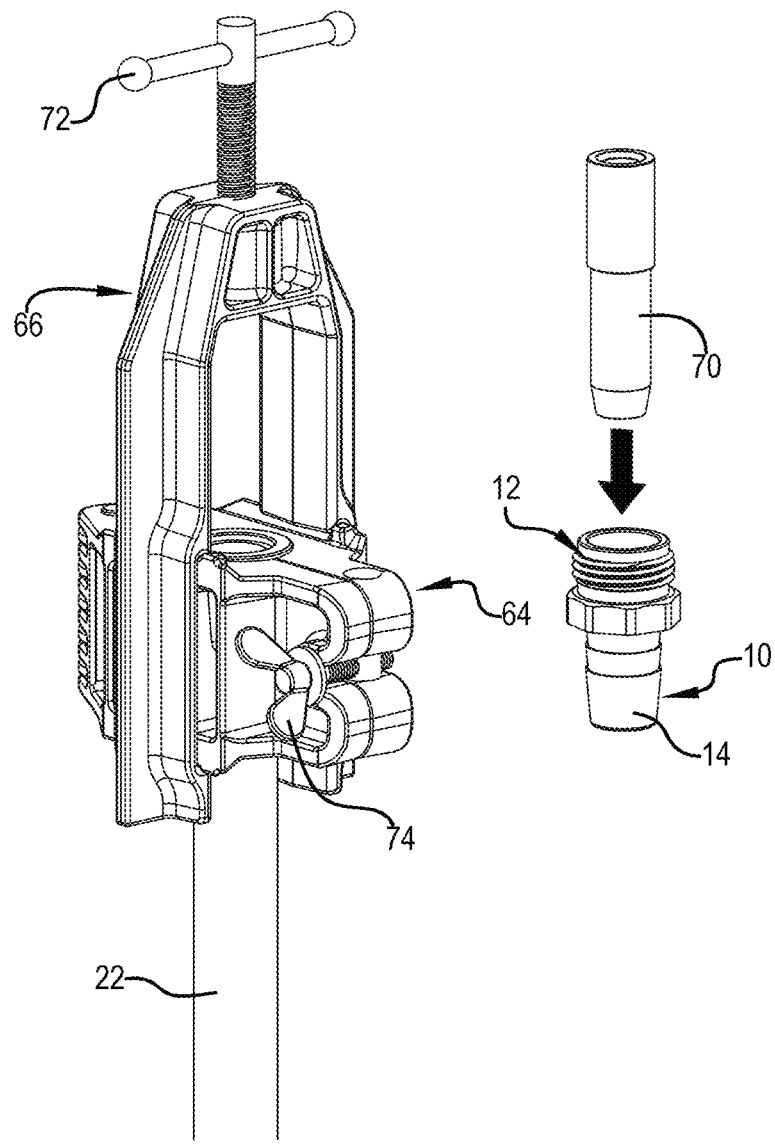
FIG. 8 depicts one exemplary manner in which one embodiment of a push rod may be placed into the barbed fitting of FIG. 7.
Figure 9:
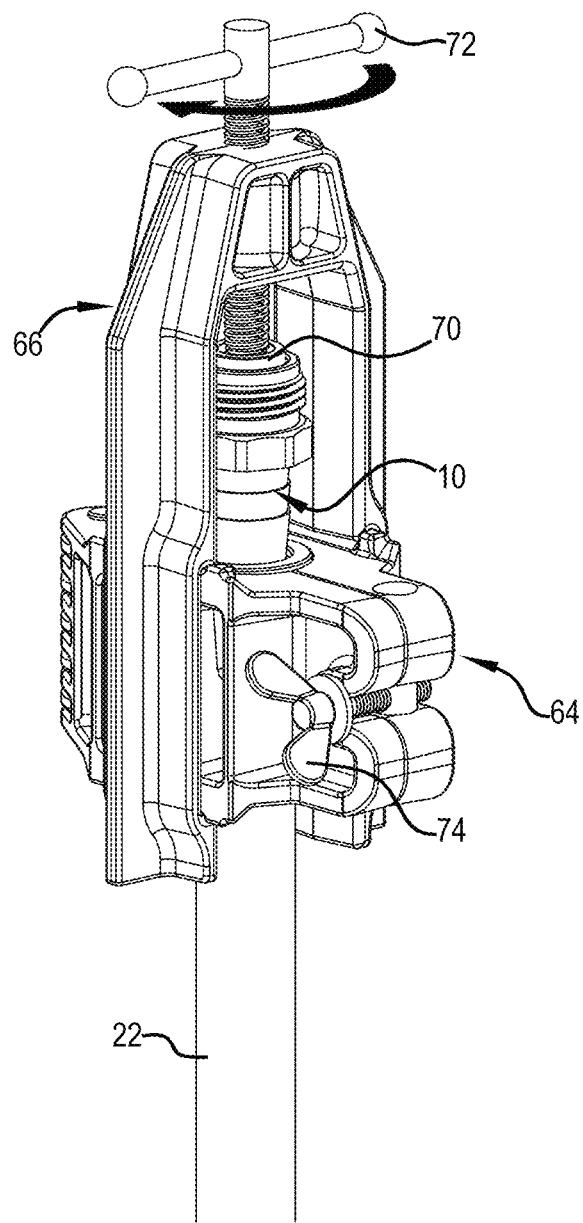
FIG. 9 depicts one exemplary manner in which the push rod and barbed fitting of FIG. 8 can be placed into the yoke and a screw of the yoke can be tightened until the barbed fitting is inserted into the hose.
Figure 10:
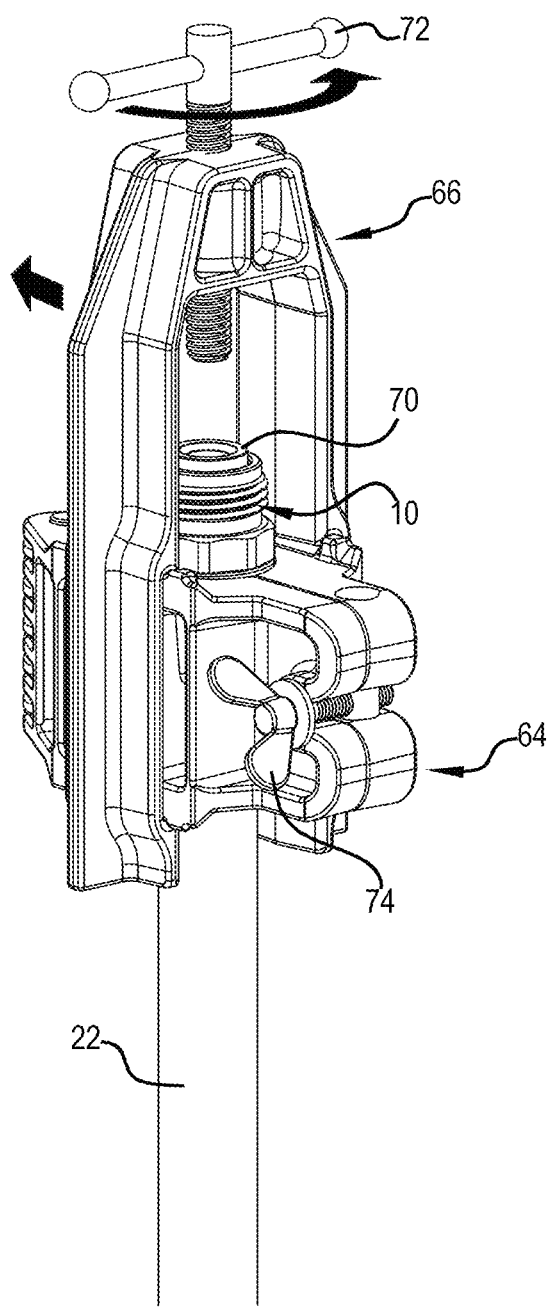
FIG. 10 depicts one exemplary manner in which the screw of the yoke depicted in FIG. 9 can be loosened and the yoke can be removed from the collet.
Figure 11:
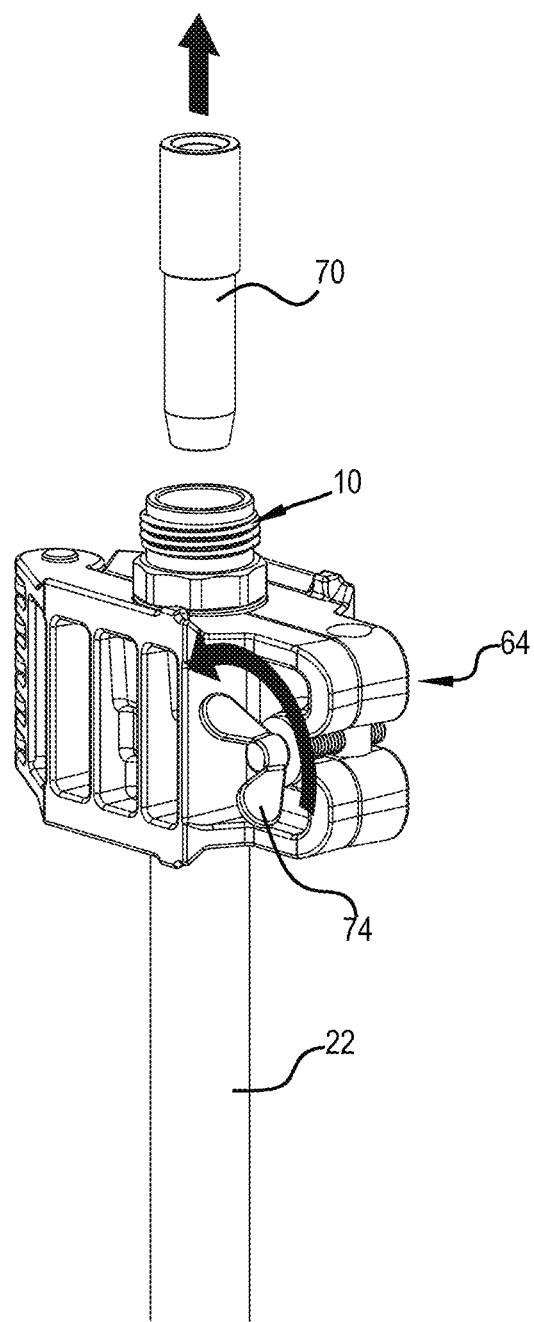
FIG. 11 depicts one exemplary manner in which the push rod of FIG. 8 can be removed and a thumb screw of the collar can be loosened.
Figure 12:
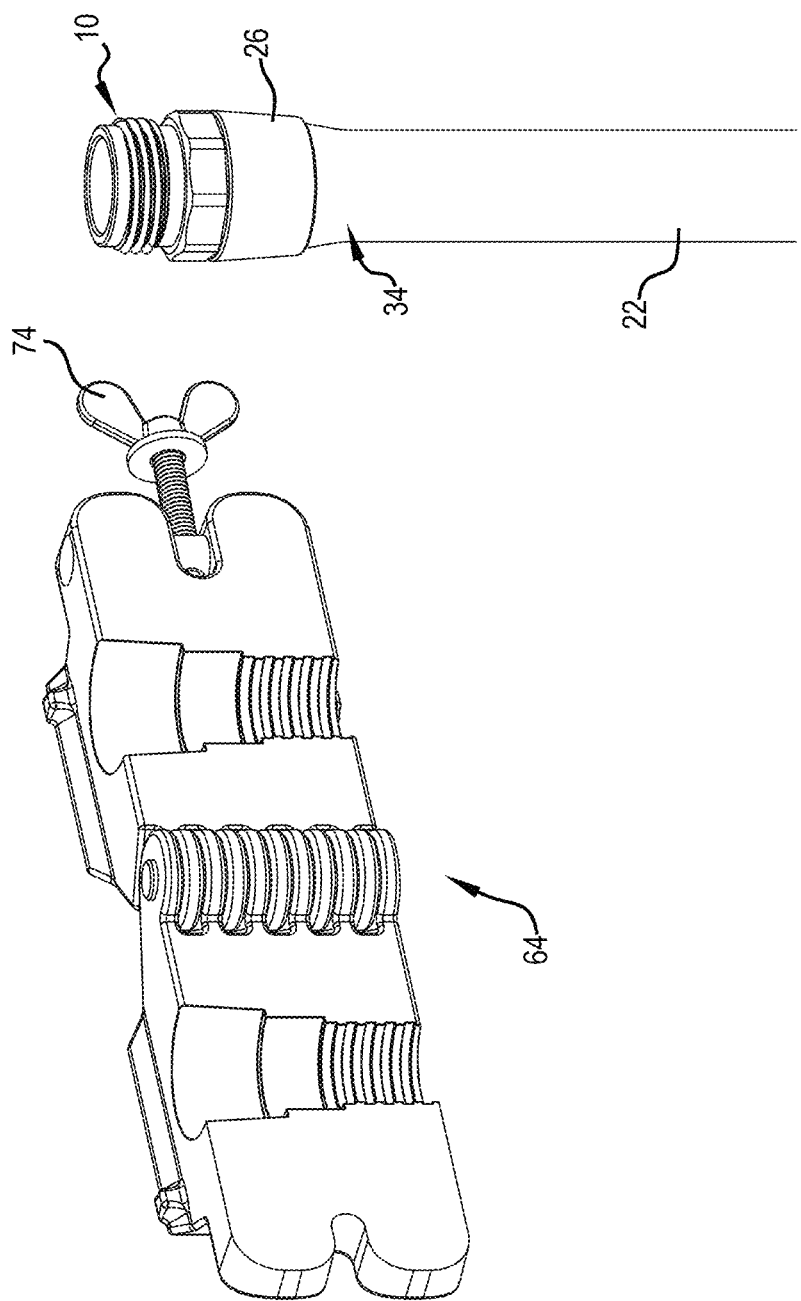
FIG. 12 depicts one exemplary manner in which the collet of FIG. 8 can be removed from the hose assembly.

FIGS. 4-12 depict an exemplary, step-by-step method of assembling an embodiment of the first hose fitting 10 of the present technology onto a length of hose 22. With reference to FIG. 4, the first retaining collar 26 of one embodiment of the first hose fitting 10 is placed on the first end portion 34 of the length of hose 22. FIG. 5 depicts one exemplary manner in which the first retaining collar 26 and first end portion 34 of the length of hose 22 can be placed into a collet 64. A yoke 66, such as depicted in FIG. 6, may then be placed onto the collet 64. Optionally, as depicted in FIG. 7, a lubricant 68, such as diluted liquid soap, can be used to wet the barbed, elongated stem 14 of the first hose fitting 10 to aid in further assembly of the fitting. With reference to FIG. 8, one embodiment of a push rod 70 may be placed into the elongated stem 14 of the first hose fitting 10 before the push rod 70 and elongated stem 14 are placed into the yoke, as depicted in FIG. 9. With further reference to FIG. 9, a screw 72 of the yoke can then be tightened until the elongated stem of the hose fitting is inserted, at least partially, into the open end portion of the length of hose. As shown in FIG. 10, the screw of the yoke 66 can then be loosened and the yoke 66 can be removed from the collet 64. The push rod 70 can then be removed and a thumb screw 74 of the collet 64 can be loosened, as depicted in FIG. 11. Finally, as depicted in FIG. 12, the collet 64 can be removed from the completed hose fitting assembly.

The present technology easily lends itself to an automated assembly process. In an exemplary automated process, the first retaining collar 26 is placed onto the first end portion 34 of a length of hose 22. The elongated stem 14 of the first hose fitting 10 may be wetted with a lubricant 68, such as diluted liquid soap, to aid in further assembly. The elongated stem 14 of the first hose fitting 10 may then be placed onto a machine support rod (not depicted). The first retaining collar 26 and length of hose 22 are then placed onto the machine support rod. The assembly machine (not depicted) is then cycled. In an exemplary embodiment of such a cycle, the machine will operate so that: a) a proximity switch detects the presence of the first hose fitting 10; b) the segmented die will grip the length of hose 22 and the first retaining collar 26; c) a proximity switch detects the first retaining collar 26 and a ram pushes the first hose fitting 10 down into the first end portion 34 of the length of hose 22 and the first retaining collar 26; d) a proximity switch detects that the ram has reached bottom (meaning that the fitting is installed completely); e) the ram retracts; f) the segmented die opens; and g) the operator pulls the length of hose 22 out of the machine.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A fitting assembly for a hose, the fitting assembly comprising:
    a first hose fitting having a fitting end and an elongated stem that extends outwardly from the fitting end; the elongated stem having a barbed external surface and an internal surface that defines an open fluid pathway through the first hose fitting; an internal diameter of the elongated stem approximating an internal diameter of the hose in an initial manufactured shape of the elongated stem; and
    a first retaining collar having a barbed internal surface that defines an opening that extends through the first retaining collar, in an initial manufactured shape; an inner diameter of the first retaining collar opening being larger than an outer diameter of the elongated stem, whereby defining a first retention space to secure a first end portion of the hose when the first end portion of the hose is disposed between the elongated stem and the first retaining collar without first reconfiguring the initial manufactured shapes of the elongated stem or the first retaining collar, directly coupling the first hose fitting with the first retaining collar, and threadably engaging the barbed internal surface of the first retaining collar with an external surface of the hose.

2. The fitting assembly of claim 1 further comprising:
    a second hose fitting having a fitting end and an elongated stem that extends outwardly from the fitting end; the elongated stem having a barbed external surface and an internal surface that defines an open fluid pathway through the second hose fitting; an internal diameter of the elongated stem approximating an inner diameter of the hose, in an initial manufactured shape of the elongated stem; and
    a second retaining collar having a barbed internal surface that defines an opening that extends through the second retaining collar, in an initial manufactured shape; an inner diameter of the second retaining collar opening being larger than an outer diameter of the elongated stem, whereby defining a second retention space to secure a second end portion of the hose when the second end portion of the hose is disposed between the elongated stem and the second retaining collar without first reconfiguring the initial manufactured shapes of the elongated stem or the second retaining collar, directly coupling the second hose fitting with the second retaining collar, and threadably engaging the barbed internal surface of the second retaining collar with an external surface of the hose.

3. The fitting assembly of claim 1 wherein:
the fitting end of the first hose fitting includes a threaded exterior surface to define a male hose fitting, which is configured to removably couple with a female hose fitting.

4. The fitting assembly of claim 2 wherein:
the fitting end of the second hose fitting includes a female hose nut, with a threaded interior surface, that is rotatably coupled with the elongated stem of the second hose fitting and configured to removably couple with a male hose fitting.

5. A combination fitting comprising:
a length of hose;
a first hose fitting having a fitting end and an elongated stem, which extends outwardly from the fitting end and at least partially into a first open end portion of the length of hose; the elongated stem having an external surface with a plurality of barbs extending from the external surface so that the plurality of barbs engage an internal surface of the length of hose; an internal diameter of the elongated stem approximating an internal diameter of the length of hose in an unexpanded state from an initial shape of the internal diameter of the elongated stem; and
a first retaining collar having a plurality of barbs extending inwardly from an open interior of the first retaining collar such that the plurality of barbs engage an exterior surface of the first open end portion of the length of hose in an uncompressed state from an initial shape of the open interior of the first retaining collar, whereby securing the first open end portion of the length of hose, in a partially deformed state, within a first retention space between the elongated stem and the first retaining collar without first reconfiguring the initial shapes of the elongated stem or the first retaining collar, directly coupling the first hose fitting with the first retaining collar, and threadably engaging an internal surface of the first retaining collar with an external surface of the length of hose.

6. The combination fitting of claim 5 further comprising:
a second hose fitting having a fitting end and an elongated stem, which extends outwardly from the fitting end and at least partially into a second open end portion of the length of hose; the elongated stem having an external surface with a plurality of barbs extending from the external surface so that the plurality of barbs engage an internal surface of the length of hose; an internal diameter of the elongated stem approximating an internal diameter of the length of hose in an unexpanded state from an initial shape of the internal diameter of the elongated stem; and
a second retaining collar having a plurality of barbs extending inwardly from an open interior of the second retaining collar such that the plurality of barbs engage an exterior surface of the second open end portion of the length of hose in an uncompressed state from an initial shape of the open interior of the second retaining collar, whereby securing the second open end portion of the length of hose, in a partially deformed state, within a first retention space between the elongated stem and the second retaining collar without first reconfiguring the initial shapes of the elongated stem or the second retaining collar, directly coupling the second hose fitting with the second retaining collar, and threadably engaging an internal surface of the second retaining collar with an external surface of the hose.

7. The combination fitting of claim 6 wherein:
the fitting end of the second hose fitting includes a female hose nut, with a threaded interior surface, that is rotatably coupled with the elongated stem of the second hose fitting and configured to removably couple with a male hose fitting.

8. The combination fitting of claim 5 wherein:
the fitting end of the first hose fitting includes a threaded exterior surface to define a male hose fitting, which is configured to removably couple with a female hose fitting.

9. A method of coupling a hose fitting with an open end portion of a length of hose, the method comprising:
positioning a retaining collar over the open end portion of the length of hose so that barbs, extending outwardly from an internal surface of the retaining collar, are positioned adjacent an external surface of the length of hose, in an initial manufactured shape;
positioning the hose fitting adjacent the open end portion of the length of hose; the hose fitting having a fitting end and an elongated stem, which extends outwardly from the fitting end; the elongated stem having an external surface with a plurality of barbs extending from the external surface; an internal diameter of the elongated stem approximating an internal diameter of the length of hose in an initial manufactured shape of the elongated stem; and
inserting the elongated stem of the hose fitting at least partially into the open end portion of the length of hose so that the plurality of barbs of the elongated stem engage an internal surface of the length of hose; an inner diameter of the retaining collar being larger than an outer diameter of the elongated stem, whereby defining a retention space to secure the open end portion of the length of hose when the open end portion of the length of hose is disposed between the elongated stem and the retaining collar without first reconfiguring the initial manufactured shapes of the elongated stem or the retaining collar, directly coupling the hose fitting with the retaining collar, and threadably engaging the barbed internal surface of the retaining collar with an external surface of the hose.

10. The method of claim 9 further comprising:
securing the retaining collar and the open end portion of the length of hose within a collet, prior to the step of inserting the elongated stem of the hose fitting at least partially into the open end portion of the length of hose.

11. The method of claim 10 further comprising:
disposing a push rod into the elongated stem of the hose fitting, prior to the step of inserting the elongated stem of the hose fitting at least partially into the open end portion of the length of hose.

12. The method of claim 11 further comprising:
lubricating the external surface of the elongated stem of the hose fitting, prior to the step of inserting the elongated stem of the hose fitting at least partially into the open end portion of the length of hose.

13. The method of claim 11 further comprising:
securing a yoke onto the collet; and
tightening the yoke until the elongated stem of the hose fitting is at least partially inserted into the open end portion of the length of hose.

14. The method of claim 13 further comprising:
lubricating the external surface of the elongated stem of the hose fitting, prior to the step of tightening the yoke until the elongated stem of the hose fitting is at least partially inserted into the open end portion of the length of hose.

15. The method of claim 14 further comprising:
removing the yoke from the collet;
removing the push rod from the elongated stem of the hose fitting; and
removing the collet from the hose fitting.

* * * * *